United States Patent
Weizman

(10) Patent No.: US 8,638,737 B2
(45) Date of Patent: Jan. 28, 2014

(54) METHOD AND APPARATUS FOR TRANSMITTING WIRELESS COMMUNICATIONS

(75) Inventor: Yaniv Weizman, Petach Tikva (IL)

(73) Assignee: Alvarion Ltd., Tel Aviv (IL)

( * ) Notice: Subject to any disclaimer, the term of this patent is extended or adjusted under 35 U.S.C. 154(b) by 458 days.

(21) Appl. No.: 12/981,170

(22) Filed: Dec. 29, 2010

(65) Prior Publication Data

US 2011/0158193 A1    Jun. 30, 2011

(30) Foreign Application Priority Data

Dec. 31, 2009  (IL) .......................................... 203053

(51) Int. Cl.
*H04W 4/00*     (2009.01)
*H04J 4/00*      (2006.01)

(52) U.S. Cl.
USPC .......................................... 370/329; 370/478

(58) Field of Classification Search
None
See application file for complete search history.

(56) References Cited

U.S. PATENT DOCUMENTS

| | | | |
|---|---|---|---|
| 2007/0086370 A1 | 4/2007 | Jang et al. | |
| 2008/0205258 A1* | 8/2008 | Kim et al. | 370/204 |
| 2009/0086670 A1* | 4/2009 | Hart et al. | 370/329 |
| 2010/0086069 A1* | 4/2010 | Usui | 375/260 |

\* cited by examiner

*Primary Examiner* — Kwang Yao
*Assistant Examiner* — Jutai Kao
(74) *Attorney, Agent, or Firm* — Browdy and Neimark, PPLC

(57) ABSTRACT

A method and apparatus are provided for use in a wireless communications system to enable dynamic selection of k sub-MAPs, and rates for transmitting these k sub-MAPs within communication frames. The method comprises the steps: a) for at least one communication frame comprised within a first interval of time, retrieving information on statistical distribution of downlink (DL) channel rates for a group of subscriber devices; b) based on that information, selecting k and corresponding transmission rates for k sub-MAPs, to minimize total amount of resources to be allocated for MAP and sub-MAPs transmission within that communication frame comprised within the first time interval and/or within a second interval of time that proceeds the first interval of time; and c) transmitting the k sub-MAPs at the selected corresponding transmission rates in communication frames comprised within the first time interval and/or within the second interval of time that proceeds the first one.

13 Claims, 4 Drawing Sheets

METHOD AND APPARATUS FOR TRANSMITTING WIRELESS COMMUNICATIONS

FIELD OF THE INVENTION

The present invention relates generally to digital wireless communications systems and methods of using them, and in particular, to allocation of resources within such systems.

BACKGROUND OF THE INVENTION

Several standards have been developed for data communications over broadband wireless links. One such standard has been set out by the IEEE 802.16 specifications and is commonly known as WiMAX. IEEE 802.16 for example defines wireless communication systems in which a Base Station (BS) communicates with Mobile Stations (MSs). The data is communicated by exchanging packets between the MSs and their respective BS. The direction of transmission of packets from the MS to the BS is referred to as uplink (UL), while the direction of transmitting packets from the BS to the MS is referred to as downlink (DL). The packets have a defined format which follows a layered protocol applied to the system and its components. The protocol layers relevant to packets called physical layer (PHY) and media access layer (MAC).

The MAC layer is used for handling various functions including bandwidth allocation, network access, and maintaining of connections. This includes controlling access of the BS and MSs to the radio medium on the basis of "frames" which are predetermined units of time in the system, and which are divided in the time and frequency domain into a number of "slots". The PHY layer is applied for the transmission technique utilized, such as OFDM (orthogonal frequency division multiplexing) or OFDMA (orthogonal frequency division multiple access). In OFDM, a single data stream is modulated onto N parallel sub-carriers, each sub-carrier signal having its own frequency range, and the sub-carriers are orthogonal in a mathematical sense so that the sub-carriers' spectra may overlap without interference due to the fact they are mutually independent. This allows the total bandwidth (i.e. all the data that should be sent within a given interval of time) to be divided over a plurality of sub-carriers. OFDMA is a multiple access variant of OFDM. It works by assigning a sub-set of the sub-carriers to an individual subscriber. This allows simultaneous transmission from several users leading to better spectral efficiency.

One of the problems associated with such type of communications is how to ensure the existence of bi-directional (UL and DL) communications without interference. There are two common approaches to overcome the physical limitation by which a radio based device cannot simultaneously transmit and receive on the same resource medium. The first, frequency division duplexing (FDD), according to which the transmission medium is sub-divided into two distinct bands, each operative at a different frequency band, one for DL and the other for UL. The second, time division duplexing (TDD), involves operating the two links at the same frequency band, but sub-dividing the access to the medium in time so that only either the DL or the UL transmissions may utilize the medium at any given point in time.

OFDMA provides a number of "sub-carrier allocation" schemes that define how the physical sub-carriers are grouped into logical sub-channels. One frame can employ several transmission techniques within separate "zones" in the time dimension, i.e. each frame is divided into DL and UL sub-frames. On the downlink transmissions, a single burst may be shared by several users but on the uplink transmissions, each burst generally corresponds to a single user. The DL sub-frame includes a broadcast control field with a DL-MAP and UL-MAP, by which the BS informs the user device of the frame structure. The MAP is a map of bandwidth allocation within the frame and also contains other PHY signaling related messages. It consists of Information Elements (MAP IEs). The MAP IEs inform mobile stations to which burst(s) their connections have been assigned to transmit and receive information. Thus, in a TDD and FDD mode network, bandwidth allocation means the allocation of resources within the frames.

The DL sub-frame has a "2-D" structure, having a defined extent in both frequency and time dimensions. Thus, the MAP provides the MS with information on the part of the frequency band to be used as well as the portion of the sub-frame duration. In most cases, the definition of the UL allocation is simpler than defining the DL allocation, as only a duration parameter is required. Thus the amount of MAP resources allocated for downlink connections is typically many times larger than for the uplink. Notwithstanding the above, in the case of using HARQ allocations in the DL direction, only the duration field within sub-burst allocation IE would be required. The DL sub-frame is divided into two main content parts. One is used for the frame MAPs while the second part is mainly used for DL data allocations. The MAPs part of the DL sub-frame is usually located within a first zone and contains the MAP IEs as well as the MSs' allocations and their related attributes such as MCS (i.e. "modulation coding scheme"), duration, etc. Most of the 802.16e frame MAPs consist of compressed basic MAPs transmitted while using robust MCS to allow coverage for all MSs within the sector. Some frames comprise sub-MAPs located at the end of compressed MAPs and transmitted with higher MCS and holding information elements for allocation of resources to MSs supporting higher DL MAP rates. Using sub-MAPs within a frame enables saving on frame resources otherwise required for the transmission of MAPs, leaving more resources available for DL data transmissions.

A number of uses for sub-MAPs are mentioned in the art:

US 2007086370 discloses a method for allocating transmission periods in a wireless network system, by providing more than one MAP (i.e. MAPs and sub-MAPs) frames to indicate downlink and uplink periods allocated by an access point to each station within a transmission frame period. The sub-MAP allocated period starts immediately after the corresponding MAP frame is transmitted, and within the transmission frame period, the sub-MAP frame is used for error recovery of downlink and uplink data. According to this disclosure, the sub-MAPs are used to retransmit the data transmitted on the downlink, and to transmit acknowledgment of the data received on the uplink.

US 2008205258 describes a method for transmitting and receiving MAP information in a communication system. According to this disclosure, the base station acquires channel quality information of each mobile station, generates sub-MAPs using MAP information separately for each mobile station according to the channel quality information, and transmits the generated sub-MAPs. The mobile station receives MAP information from the base station, detects a sub-MAP allocated thereto from the received MAP information, and restores the detected sub-MAP to MAP information using the same scheme applied in the base station, based on channel quality information of the mobile station.

SUMMARY OF THE INVENTION

It is an object of the present invention to provide a novel method for dynamic incorporation of sub-MAPs within at least some of the frames transmitted to a mobile subscriber.

It is another object of the present invention to provide a method for improving the use of the sub-MAPs without adversely affecting DL communications.

It is another object of the present invention to provide a method for determining the optimal sub-MAPs rates per interval of time.

It is yet another object of the present invention to provide a method for dynamic adaption of the interval of time length for the transmission of sub-MAPs.

It is still another object of the present invention to provide a method for partially or fully overriding scheduled sub-MAPs in a frame based on near real time allocated resources for maps and sub-MAPs transmission.

Other objects of the invention will be described hereinafter.

According to a first embodiment of the invention, there is provided a method for use in a wireless communications system to enable dynamic selection of k sub-MAPs, k being an integer that is equal to 0, 1, . . . , and rates of transmission for transmitting the k sub-MAPs within at least one communication frame, wherein the k sub-MAPs are transmitted from a base station to at least one subscriber device, and comprising:

a. for the at least one communication frame comprised within a first interval of time, retrieving information on statistical distribution of DL channel rates for a group of subscriber devices;

b. based on the retrieved information, selecting k sub-MAPs and corresponding transmission rates for the k sub-MAPs, to enable minimizing total amount of resources that would be required for MAP and sub-MAPs transmission within that at least one communication frame comprised within the first time interval and/or within a second interval of time that proceeds that first interval of time;

c. transmitting the k sub-MAPs at the selected corresponding transmission rates in one or more communication frames comprised within said first interval of time and/or within the second interval of time that proceeds the first interval of time.

The term "MAP" as used herein and throughout the specification and claims should be understood to encompass a data structure (e.g. a message) transmitted by the base station to inform terminals of the resource allocation for the DL and UL channels so that further communications between the base station and a terminal or group of terminals receiving such data structure will occur within the allocated resource blocks allocated for exchanging communications with that terminal or a group of terminals.

The term "sub-MAP rate" as used herein and throughout the specification and claims should be understood to encompass the rate of transmitting MAPs (e.g. control information) at typically higher rate than rate used for transmitting the basic/main MAPs within a frame, in order to reduce the total resources used for the transmission of MAPs.

According to another embodiment of the invention, the retrieved information is derived from DL and UL allocations of resources within the first interval of time, and is associated with respective subscriber devices.

By yet another embodiment of the invention, step b. further comprises estimating resources required for transmission of MAPs and sub-MAPs, had the selected sub-MAPs transmission rates been applied, and determining if the estimated resources for the selected transmission rates is lower than the resources required for MAPs transmission when no sub-MAPs are transmitted within a corresponding interval of time.

In accordance with yet another embodiment, step b. is repeated at least once and wherein in each such repetition, different value of k (the number of sub-MAPs) and/or different sub-MAPs transmission rates are selected to allow determining which of the different selected number of sub-MAPs and their corresponding transmission rates would yield the minimal amount of resources required to be allocated for the transmission of the MAPs and sub-MAPs. Preferably, if there are no selected sub-MAPs and their corresponding transmission rates that would yield an estimation of total amount of resources allocation required for transmission of MAPs and sub-MAPs that is lower than the total amount of resources required to be allocated for MAPs transmission when no sub-MAPs are transmitted within the first interval of time, then no sub-MAPs will be transmitted during the first and/or a proceeding interval of time.

In addition or in the alternative, if there are no selected sub-MAPs and corresponding transmission rates thereof that result in estimation of total amount of resources allocation required for transmission of MAPs and sub-MAPs that is lower than a pre-determined value, then no sub-MAPs would be transmitted during the first and/or a proceeding interval of time.

By still another embodiment of the invention, the information that relates to a distribution of DL channel rates to at least one subscriber device comprises statistics of achievable DL channel rates distribution based on active allocations within the at least one communication frame of the respective first interval of time.

By yet another embodiment of the invention, the length of the interval of time is dynamically adapted to accommodate the k number of sub-MAPs scheduled for that interval of time.

According to another aspect of the present invention, there is provided a base station adapted for use in a wireless communications system and to enable dynamic selection of k number of sub-MAPs, k being an integer equals to 0, 1, . . . , and corresponding transmission rates thereto, to be transmitted from that base station to at least one subscriber device. The base station comprising:

a transmitter operative to transmit communication frames towards a plurality of subscriber devices;

a processor operative to:

a. retrieve information that relates to a distribution of DL channel rates supported by a number of subscriber devices within an interval of time, and wherein the retrieved information is based upon active allocations of resources within that interval of time for the number of subscriber devices;

b. select k number of sub-MAPs and corresponding transmission rates for transmitting the sub-MAPs in at least one communication frame comprised in the interval of time, wherein the selection is based upon estimation of required resources for transmitting MAPs and sub-MAPs had the selected sub-MAPs and their corresponding transmission rates been applied; and c. prepare the k selected sub-MAPs for transmission within the at least one communication frame comprised in that interval of time and/or in a interval of time proceeding thereto.

In accordance with another embodiment of this aspect of the invention, the processor is adapted to select the k number of sub-MAPs and their corresponding transmission rates for transmitting these sub-MAPs based upon estimating the required resources had the selected sub-MAPs and their corresponding transmission rates been applied, and to determine if the estimated resources required for transmitting the MAPs and the sub-MAPs is lower than the resources required for the MAPs transmission when no sub-MAPs are transmitted within that interval of time.

According to yet another embodiment, the processor is adapted to repeat the selection of these k sub-MAPs and their corresponding transmission rates for transmitting the sub-MAPs at least once, and wherein in each such repetition a different number of k, and/or different corresponding transmission rates thereof are selected to allow determining which of the different selected k sub-MAPs and the transmission rates of these k sub-MAPs would yield the minimum resources required for transmission of MAPs and sub-MAPs.

Preferably, the processor is operative to determine if k selected sub-MAPs and their corresponding transmission rates result in an estimation that a total amount of resources required for transmission of MAPs and sub-MAPs is lower than the total amount of resources required for transmission of MAPs if no sub-MAPs are incorporated within that interval of time, then no sub-MAPs will be incorporated in that respective interval of time.

According to another preferred embodiment, the processor is further adapted to determine if k selected sub-MAPs and their corresponding transmission rates result in an estimation that a total amount of resources required for transmission of MAPs and sub-MAPs is lower than a pre-determined value, in which case no sub-MAPs will be incorporated in that respective interval of time.

In accordance with still another embodiment, the processor is operative to dynamically adapt the length of the interval of time to accommodate the k sub-MAPs scheduled for that interval of time.

By still another embodiment, the processor is further adapted to determine during the interval of time, whether the total amount of resources required for transmission of MAPs and sub-MAPs associated with the interval of time is greater than a pre-determined value, and if in the affirmative, to prevent the transmitter from transmitting the one or more sub-MAPs scheduled for transmission during said interval of time.

BRIEF DESCRIPTION OF THE DRAWINGS

A better understanding of the present invention may be obtained when the following non-limiting detailed description is considered in conjunction with the accompanying figures.

FIGS. 1A to 1D illustrate different frames according to the IEEE 802.16 standard, wherein:

FIG. 1A—presents a typical communication TDD frame that does not comprise a sub-MAP;

FIG. 1B—presents a communication frame according to an embodiment of the present invention, which comprises a sub-MAP and consequently the zone for transmitting DL data is larger than that zone in the frame of FIG. 1A;

FIG. 1C—presents a communication frame that comprises a sub-MAP;

FIG. 1D—presents a communication frame that comprises a sub-MAP and yet the DL zone is substantially equal to that of FIG. 1A;

FIGS. 2A to 2C illustrate several examples of deferent sub-MAP transmission rates in communication frames, and different lengths of intervals of time according to an embodiment of the present invention, wherein:

FIG. 2A—presents an example of incorporating several sub-MAP rates in constant length intervals of time;

FIG. 2B—presents another example where the sub-MAPs transmission rate and the length of the interval of time change;

FIG. 2C—presents a further example where some of the scheduled sub-MAPs are overridden;

DETAILED DESCRIPTION OF THE INVENTION

Figure 1:
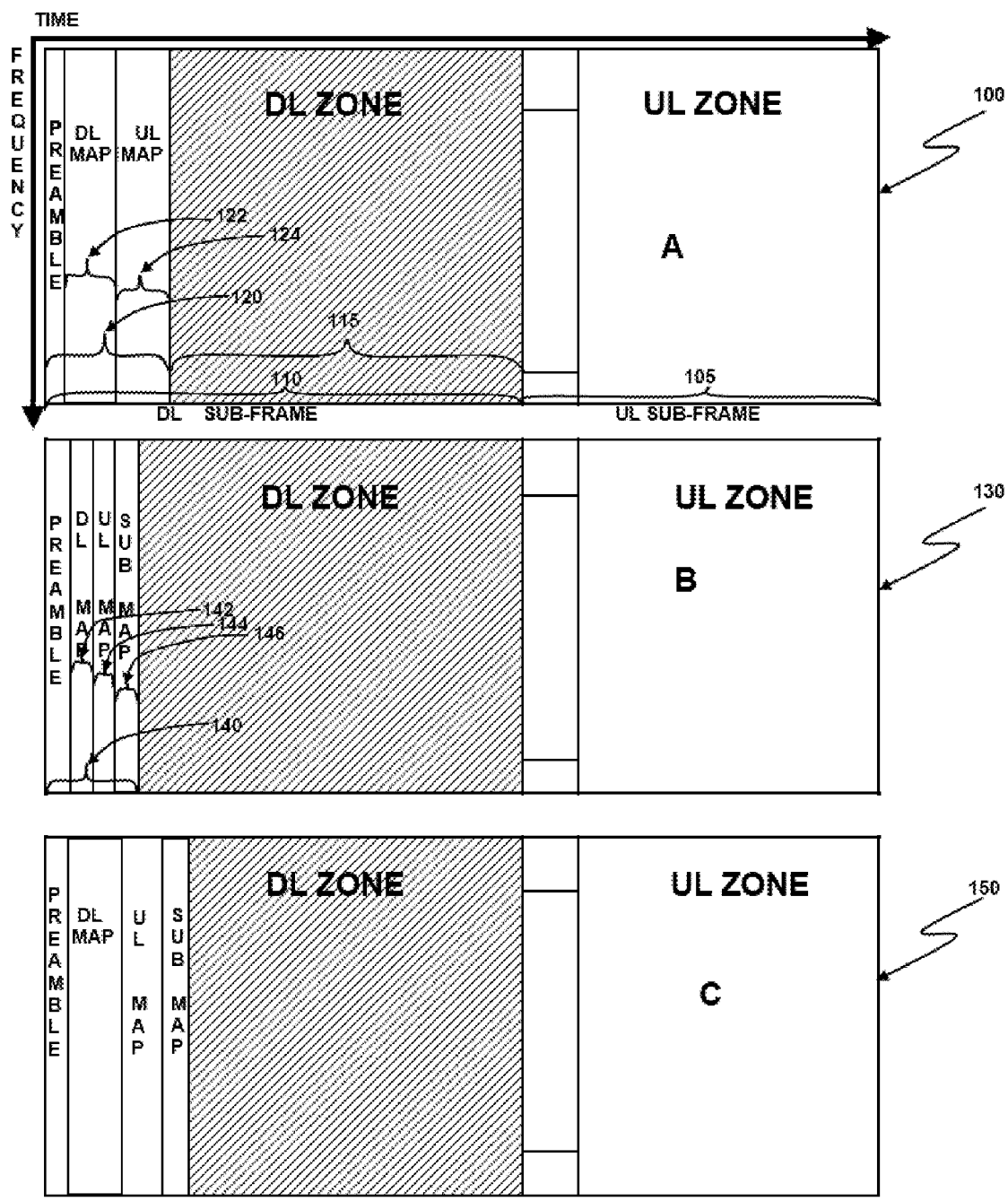
Figure 1:
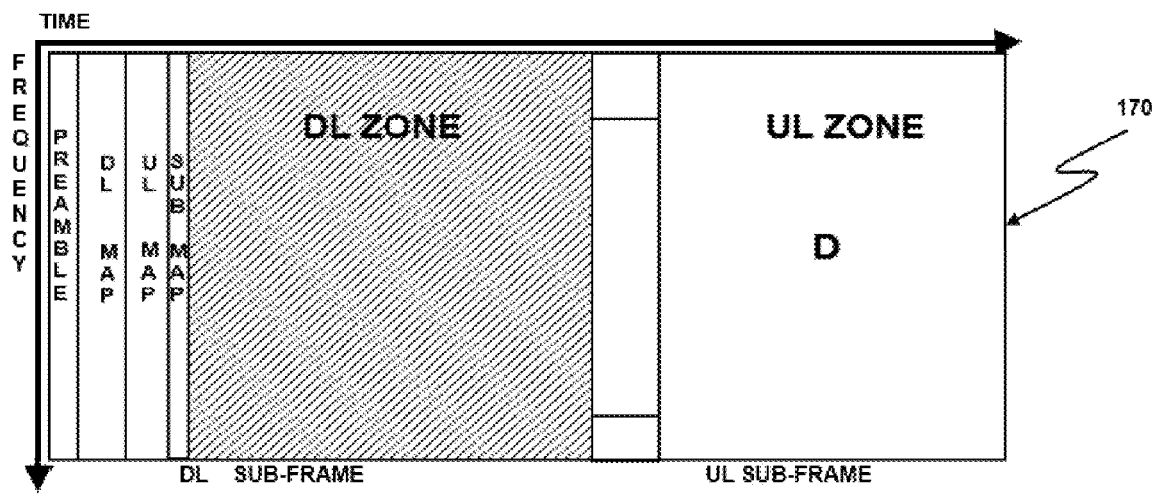

Frame 100 illustrated in FIG. 1A is a standard Time Division Multiplexing frame constructed according to IEEE 802.16e. Although the frame illustrated in this frame is a TDD frame, the present invention should not be understood as being limited to that type of frames, but can also apply to FDD type of frames (mutates mutandis). As may be seen in this Fig., frame 100 is divided into DL sub-frame (110) and UL sub-frame (105), each directed for transmitting information in the DL direction and in the UL direction, respectively. DL sub-frame 110 is divided into two main content parts. The part 115 which is allocated mainly for transmission of DL data and the part 120 that is used for transmitting the frame's MAP. The frame's MAP part comprises the DL MAP (122) and the UL MAP (124).

Frame 130, in FIG. 1B has a similar structure except for the fact that it comprises a sub-MAP (146) in the frame's MAP part (140). As may be noted, the DL MAP (142) the UL MAP (144) and the sub-MAP (146) now require fewer resources than the resources required in FIG. 1A (due to the use of the sub-MAP) and as a result, the DL zone for data transmission in frame 130 is larger than the DL zone for data transmission in frame 100. Also, as will be appreciated by those skilled in the art, although this Fig. (as well as proceeding Figs.) illustrate one sub-MAP (146 in this Fig.), still, the examples illustrated may also encompass cases of more than one sub-MAP mutatis mutandis, which are not shown in the respective Figs., that are incorporated in the various communication frames.

However, adding a sub-MAP would not result every time in extending the DL zone for data transmission. As can be seen in frame 150 of FIG. 1C, in some cases (e.g. increased mobility of the MS, or when a high number of allocations within a frame are directed for MSs that do not support the sub-MAP rate due to relatively bad channel conditions (e.g. at the cell border, cell edge, etc.)) when the UL MAP and the DL MAP cannot be shortened, adding a sub-MAP might even result in reducing the DL zone available for data transmission.

In the case presented in FIG. 1D, where no gain or loss of resources used for maps and sub-maps transmission is caused by adding the sub-MAP, the DL zone for data transmission in frame 170 is practically equal to the DL for data transmission as in frame 100.

In summary, FIG. 1 demonstrates that inserting one or more sub-MAPs into a frame may result in better utilization of the DL sub-frame by increasing the available resources that may be allocated for DL data transmission (at the expense of MAP resources), but also might result in a waste of resources for DL data transmission, if used under certain scenarios.

Figure 2:
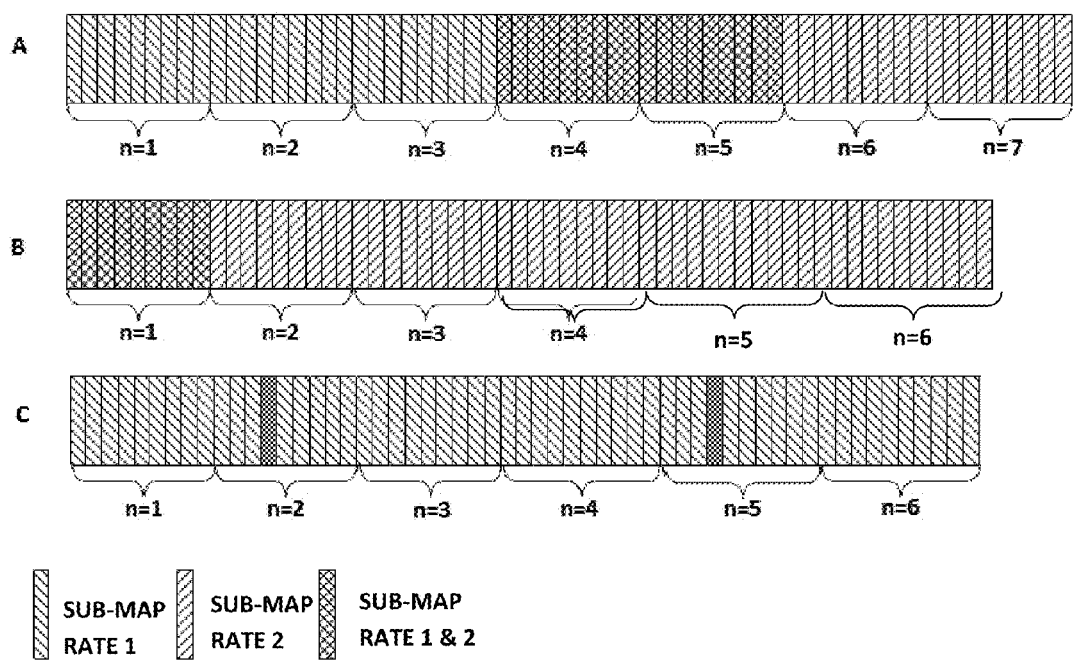

FIG. 2 demonstrates the incorporation of one or more sub-MAPs with different transmission rates within communication frames, according to an embodiment of the present invention. FIG. 2A is an example of a simple case in which there are seven intervals of time (n=1 to n=7) each comprised of 9 frames, intervals of time n=1 to n=3 incorporate sub-MAP transmitted at transmission rate 1, interval of times n=4 to n=5 incorporate two sub-MAPs in each frame transmitted at transmission rate 1 and rate 2 respectively, while intervals of times n=6 and n=7 incorporate sub-MAP transmitted at transmission rate 2.

FIG. 2A also provides an insight on a preferred embodiment of the present invention for determining the optimal rate for transmission of sub-MAPs within various intervals of time. As may be seen in this Fig., the transmission rate of the sub-MAPs incorporated in the first three intervals of time is rate 1, in the two proceeding intervals of time—two different rates, 1 and 2, while in intervals No. 6 and 7 only rate 2 is used for the transmission of the sub-MAPs.

Preferably, the sub-MAP incorporation rates are derived by using averaged statistics of the MSs DL channel rates distribution, based on the active allocations of resources within the frames of each interval of time. At the end of an interval of time, the statistics that were gathered so far during that interval of time are used in estimating the total resources required for allocation for the transmission of MAPs and sub-MAPs, where the various estimations are executed while applying different number of candidate sub-MAPs and their corresponding rates. The number of sub-MAPs and their corresponding transmission rates combination is selected to minimize the resources required for MAPs and sub-MAPs transmission being selected as the suggested sub-MAP rates for the current and/or following interval of time. In the example illustrated in FIG. 2A, at the end of the third interval of time, the estimation of the total amount of resources required for maps and sub-maps transmission estimation indicates that it might be better to change the sub-MAPs transmission rates, accordingly, for every frame comprised in intervals of time n=4 and n=5 two sub-MAPs are incorporated, one transmitted at rate 1 and the other one at rate 2.

At the end of interval of time n=5, the estimated total amount of resources required for the transmission of MAPs and sub-MAP at rate 2 indicates a lower value than of using two sub-MAPs with rate 1 and rate 2, respectively, therefore in intervals of time n=6 and n=7 the sub-MAPs transmission rate applied is only rate 2.

FIG. 2B demonstrates a dynamic adaptation of the interval of time length according to an embodiment of the present invention. As may be seen in this Fig., the first interval of time has the same sub-MAPs transmission rates as the intervals of time where n=4 and n=5 in FIG. 1A, i.e. two sub-MAPs in each frame transmitted at transmission rate 1 and rate 2, respectively. The estimated total amount of resources required for the transmission of MAPs and sub-MAPs at the end of the first interval of time suggested that a different sub-MAPs transmission rate is used, and in intervals of time n=2 to n=4 the sub-MAPs transmission rate is changed to transmission rate 2. In this example, for the three intervals of time where the sub-MAPs transmission rate has not been changed, the length of the interval of time is changed from 9 frames per interval of time (as in the intervals n=1 to n=4) to 11 frames per interval (as in intervals n=5 to n=6). Using the dynamic interval of time length, one may ensure longer intervals for low DL channel rates distribution changes of active allocations; and shorter intervals for high DL channel rates distribution environment (due to high mobility or scheduling changes). As long as there is no change in the suggested sub-MAPs transmission rates between successive intervals of time, the following interval of time length may be increased in order to better suit the new sub-MAPs transmission rates.

FIG. 2C demonstrates an example for a mechanism for overriding scheduled sub-MAPs in specific frames wherein total resources required for MAPs and sub-MAPs transmission are not lower than total resources required to transmit MAPs with no sub-MAPs (due to QoS scheduling changes or due to lack of frames' data slots resources). The sub-MAPs incorporation rate in interval of times n=1 to n=6 is rate 1, but in interval of times n=2 and n=5 the sub-MAP scheduled for in the fourth frame is overridden (shown in dark grey in FIG. 2C). Since Sub-MAP selection is determined based on statistical averaging, there are cases where the estimated amount of total resources required for the transmission of MAPs and sub-MAPs at the end of the previous interval of time is not accurate enough, for example due to mass broadcast transmissions within a frame. The process for overriding a sub-MAP will be further discussed at length. However, a successive interval of time would be an interval of time at which none of its scheduled sub-MAPs have been overridden. Nevertheless, one should bear in mind that in a single interval of time that comprises more than one frame the scheduled sub-MAPs that may be overridden, may belong to more than one frame.

Figure 3:
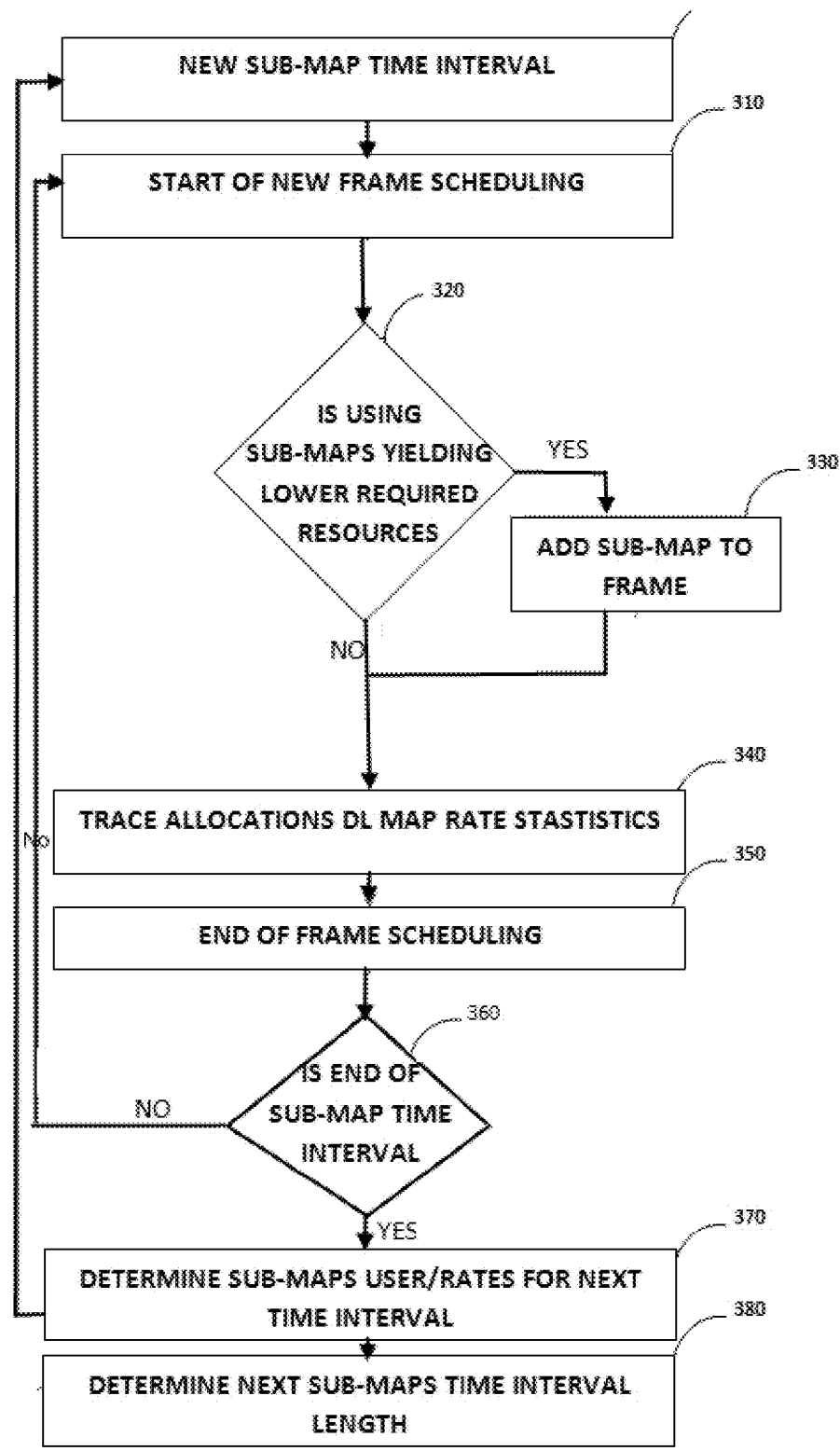
FIG. 3—is a flow chart illustrating an embodiment of the present invention that enables selecting of sub-MAPs transmission rates.

FIG. 3 is a flow chart demonstrating a method of implementing an embodiment of the method provided by the present invention. This embodiment includes a procedure for selecting one or more sub-MAPs transmission rates by overriding sub-MAP used within the current interval, as well as statistics accumulated for taking decisions at the end of the sub-MAP interval. This procedure enables the inclusion of sub-MAPs at the current interval of time and/or at the beginning of the next time interval, as well as to determine the length of the next time interval.

The method illustrated in FIG. 3 begins with a new interval of time (step 300) followed by scheduling the sub-MAPs transmission rates at which the sub-MAPs comprised in that interval of time are transmitted (step 310). Next, checking (step 320) if for a given frame that is scheduled for incorporating one or more sub-MAPs associated with certain transmission rates will result in lowered amount of resources required for the transmission of MAPs and sub-MAPs. If the estimated amount of resources required for the transmission of MAPs and sub-MAPs provides an affirmative answer (i.e. lower than if no sub-MAP is incorporated), the one or more sub-MAPs are added to the frame (step 330) and the system traces the statistics associated with the allocations of the DL channel rates (step 340). Otherwise, the system goes directly to step 340 of tracing the statistics associated with the allocations of the supported DL channel rates. Following step 340, the scheduling process of incorporating the sub-MAPs in the frames is terminated (step 350). Next the system checks whether the end of the interval of time has been reached (step 360). If in the affirmative, the next step would be to determine the sub-MAPs transmission rates that should be used for the proceeding interval of time (step 370). If not, the system returns to step 310 in order to schedule the communication frames comprised in that interval of time, in which sub-MAPs will be incorporated. Following step 370, the system determines the length of the proceeding interval of time (i.e. the number of communication frames to be included in the interval of time), (step 380). The process re-iterated from step 300 for the new (proceeding) interval of time.

Figure 4A:
FIG. 4A—exemplifies a prior art 802.16m TDD frame that includes sub-MAPs.
Figure 4B:
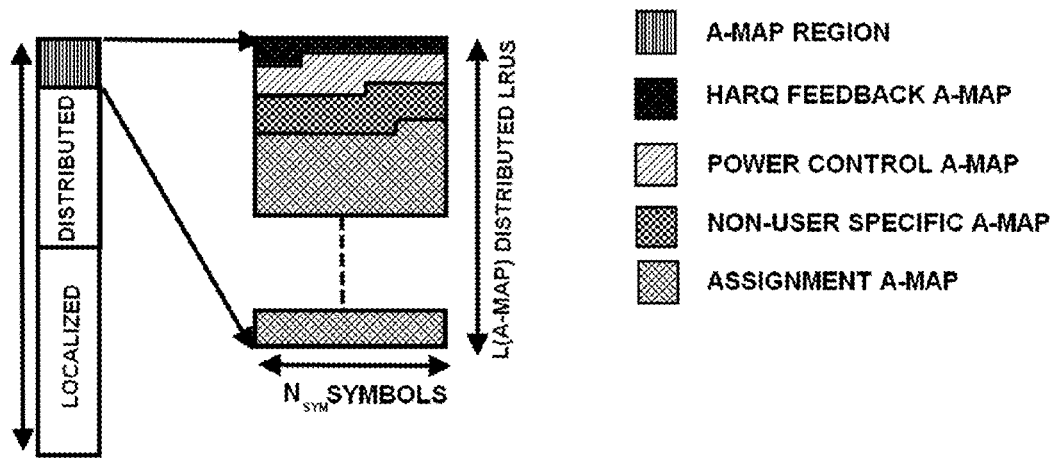
FIG. 4B—illustrates an embodiment of the method provided by the present invention to reduce the resource consumption of A-MAPs within the DL sub-frames by using sub-MAPs.

FIGS. 4A and 4B demonstrate an example where 802.16m TDD frame as described in IEEE Recommendation 802.16m/ D3, is used.

In the example illustrated in FIG. 4A, there are 4 DL sub-frames and A-MAP within each of these sub-frames. It should be noted that each of the DL sub-frames contains MAPs, hence, it would be preferred to reduce the resource consumption of A-MAP within the DL sub-frames by using sub-MAPs, preferably that are included within every sub-frame. For every DL Sub-frame, the structure of the A-MAPs is as shown in FIG. 4B.

The assignment A-MAPs may be transmitted at different rates and the solution proposed by the present invention may be applied in this case. In addition, it may allow the selection of the rates among all possible number of sub-MAPs and their corresponding rates. As will be appreciated by those skilled in the art, although the frame illustrated is a TDD frame, the present invention is not restricted to TDD type of communications and may be applied when FDD type of communications is used as well.

The invention claimed is:

1. A method for use in a wireless communications system to enable dynamic selection of k sub-MAPs, k being an integer that is equal to 1, . . . N, where N is a positive integer, and of rates for transmitting said k sub-MAPs within at least one communication frame, wherein said k sub-MAPs are transmitted from a base station to at least one subscriber device, said method comprising:
   a. for the at least one communication frame comprised within a first interval of time, retrieving information on statistical distribution of downlink (DL) channel rates for a group of subscriber devices;
   b. based on said information, selecting k and corresponding transmission rates for said k sub-MAPs, to minimize total amount of resources that should be allocated for transmitting MAP and sub-MAPs within said at least one communication frame comprised within said first time interval and/or within a second interval of time that proceeds said first interval of time, and estimating resources required for transmission of MAPs and sub-MAPs had the selected sub-MAPs transmission rates been applied and determining if the estimated resources for the selected transmission rates is lower than the resources required for MAPs transmission when no sub-MAPs are transmitted within a corresponding interval of time;
   c. transmitting said k sub-MAPs at the selected corresponding transmission rates in one or more communication frames comprised within said first time interval and/or within said second interval of time that proceeds said first interval of time.

2. A method according to claim 1, wherein said retrieved information is derived from DL and uplink (UL) allocations of resources within said first interval of time for said subscriber devices.

3. A method according to claim 1, wherein the length of said interval of time is dynamically adapted to accommodate the k number of sub-MAPs scheduled for said interval of time.

4. A method for use in a wireless communications system to enable dynamic selection of k sub-MAPs, k being an integer that is equal to 1, . . . N, where N is a positive integer, and of rates for transmitting said k sub-MAPs within at least one communication frame, wherein said k sub-MAPs are transmitted from a base station to at least one subscriber device, said method comprising:
   a. for the at least one communication frame comprised within a first interval of time, retrieving information on statistical distribution of downlink (DL) channel rates for a group of subscriber devices;
   b. based on said information, selecting k and corresponding transmission rates for said k sub-MAPs, to minimize total amount of resources that should be allocated for transmitting MAP and sub-MAPs within said at least one communication frame comprised within said first time interval and/or within a second interval of time that proceeds said first interval of time, wherein step b, is repeated at least once and wherein in each such repetition, a different value of k, and/or different sub-MAPs transmission rates are selected to allow determining which of the different selected number of sub-MAPs and the corresponding transmission rates for said k sub-MAPs would yield the minimal amount of resources to be allocated for transmitting said MAPs and sub-MAPs, and
   c. transmitting said k sub-MAPs at the selected corresponding transmission rates in one or more communication frames comprised within said first time interval and/or within said second interval of time that proceeds said first interval of time.

5. A method according to claim 4, and wherein if there are no selected sub-MAPs and the corresponding transmission rates for said k sub-MAPs that yield an estimation of total amount of resources to be allocated for transmitting MAPs and sub-MAPs that is lower than the total amount of resources to be allocated for MAPs transmission when no sub-MAPs would be transmitted within said first interval of time, then no sub-MAPs will be transmitted during the first and/or a proceeding interval of time.

6. A method according to claim 4, wherein if there are no selected sub-MAPs and corresponding transmission rates thereof that result in estimation of total amount of resources required for transmission of MAPs and sub-MAPs that is lower than a pre-determined value, then no sub-MAPs would be transmitted during the first and/or a proceeding interval of time.

7. A method for use in a wireless communications system to enable dynamic selection of k sub-MAPs, k being an integer that is equal to 1, . . . N, where N is a positive integer, and of rates for transmitting said k sub-MAPs within at least one communication frame, wherein said k sub-MAPs are transmitted from a base station to at least one subscriber device, said method comprising:
   a. for the at least one communication frame comprised within a first interval of time, retrieving information on statistical distribution of downlink (DL) channel rates for a group of subscriber devices;
   b. based on said information, selecting k and corresponding transmission rates for said k sub-MAPs, to minimize total amount of resources that should be allocated for transmitting MAP and sub-MAPs within said at least one communication frame comprised within said first time interval and/or within a second interval of time that proceeds said first interval of time, and
   c. transmitting said k sub-MAPs at the selected corresponding transmission rates in one or more communication frames comprised within said first time interval and/or within said second interval of time that proceeds said first interval of time,
   wherein said information that relates to a distribution of DL channel rates to at least one subscriber device, comprises statistics of achievable DL channel rates distribution based on active allocations within the at least one communication frame of the respective first interval of time.

8. A base station adapted for use in a wireless communications system and to enable dynamic selection of k number of sub-MAPs, k being an integer equals to 1, . . . N, where N is a positive integer, and corresponding transmission rates thereto, to be included within at least one communication frame transmitted from said base station to at least one subscriber device, said base station comprising:
- a transmitter operative to transmit communication frames towards a plurality of subscriber devices;
- a processor operative to:
  i. retrieve information that relates to a distribution of downlink (DL) channel rates supported by a number of subscriber devices within an interval of time, and wherein the retrieved information is based upon active allocations of resources within said interval of time for said number of subscriber devices;
  ii. select k number of sub-MAPs and corresponding transmission rates for transmitting said sub-MAPs in at least one communication frame comprised in said interval of time, wherein the selection is based upon estimation of required resources for transmitting MAPs and sub-MAPs had the selected sub-MAPs and the corresponding transmission rates to said selected sub-MAPs been applied; and
  iii. prepare said k selected sub-MAPs for transmission within said at least one communication frame comprised in said interval of time and/or in a interval of time proceeding thereto,
wherein said processor is adapted to select said k sub-MAPs and their corresponding transmission rates for transmitting said sub-MAPs based upon estimating said required resources had the selected sub-MAPs and their corresponding transmission rates been applied, and to determine if the estimated resources required for transmitting the MAPs and the sub-MAPs is lower than the resources required for the MAPs transmission when no sub-MAPs are transmitted within said interval of time.

9. A base station according to claim 8, wherein the processor is operative to dynamically adapt the length of said interval of time to accommodate the k sub-MAPs scheduled for said interval of time.

10. A base station adapted for use in a wireless communications system and to enable dynamic selection of k number of sub-MAPs, k being an integer equals to 1, ... N, where N is a positive integer, and corresponding transmission rates thereto, to be included within at least one communication frame transmitted from said base station to at least one subscriber device, said base station comprising:
- a transmitter operative to transmit communication frames towards a plurality of subscriber devices;
- a processor operative to:
  i. retrieve information that relates to a distribution of downlink (DL) channel rates supported by a number of subscriber devices within an interval of time, and wherein the retrieved information is based upon active allocations of resources within said interval of time for said number of subscriber devices;
  ii. select k number of sub-MAPs and corresponding transmission rates for transmitting said sub-MAPs in at least one communication frame comprised in said interval of time, wherein the selection is based upon estimation of required resources for transmitting MAPs and sub-MAPs had the selected sub-MAPs and the corresponding transmission rates to said selected sub-MAPs been applied; and
  iii. prepare said k selected sub-MAPs for transmission within said at least one communication frame comprised in said interval of time and/or in a interval of time proceeding thereto,
wherein said processor is adapted to repeat the selection of said k sub-MAPs and their corresponding transmission rates for transmitting the sub-MAPs at least once, and wherein in each such repetition a different number of k sub-MAPs, and/or different corresponding transmission rates thereof are selected to allow determining which of the different selected k sub-MAPs and their corresponding transmission rates would yield the minimum resources required for transmission of MAPs and sub-MAPs.

11. A base station according to claim 10, wherein said processor is operative to determine if k selected sub-MAPs and corresponding transmission rates thereof result in an estimation that a total amount of resources required for transmission of MAPs and sub-MAPs is lower than the total amount of resources required for transmission of MAPs if no sub-MAPs are incorporated within said interval of time, then no sub-MAPs will be incorporated in that respective interval of time.

12. A base station according to claim 10, wherein said processor is further adapted to determine if k selected sub-MAPs and corresponding transmission rates thereof result in an estimation that a total amount of resources required for transmission of MAPs and sub-MAPs is lower than a pre-determined value, then no sub-MAPs will be incorporated in that respective interval of time.

13. A base station adapted for use in a wireless communications system and to enable dynamic selection of k number of sub-MAPs, k being an integer equals to 1, ... N, where N is a positive integer, and corresponding transmission rates thereto, to be included within at least one communication frame transmitted from said base station to at least one subscriber device, said base station comprising:
- a transmitter operative to transmit communication frames towards a plurality of subscriber devices;
- a processor operative to:
  i. retrieve information that relates to a distribution of downlink (DL) channel rates supported by a number of subscriber devices within an interval of time, and wherein the retrieved information is based upon active allocations of resources within said interval of time for said number of subscriber devices;
  ii. select k number of sub-MAPs and corresponding transmission rates for transmitting said sub-MAPs in at least one communication frame comprised in said interval of time, wherein the selection is based upon estimation of required resources for transmitting MAPs and sub-MAPs had the selected sub-MAPs and the corresponding transmission rates to said selected sub-MAPs been applied; and
  iii. prepare said k selected sub-MAPs for transmission within said at least one communication frame comprised in said interval of time and/or in a interval of time proceeding thereto,
wherein said processor is further adapted to determine during said interval of time, whether the total amount of resources required for transmission of MAPs and sub-MAPs associated with said interval of time is greater than a pre-determined value, and if in the affirmative, to prevent said transmitter from transmitting the sub-MAPs scheduled for transmission during said interval of time.

* * * * *